US008595175B2

(12) United States Patent
Vickers et al.

(10) Patent No.: US 8,595,175 B2
(45) Date of Patent: Nov. 26, 2013

(54) FLUENT API PATTERNS FOR MANAGING OBJECT PERSISTENCE

(75) Inventors: Arthur John Cerdic Vickers, Redmond, WA (US); Diego Bernardo Vega, Sammamish, WA (US); Rowan Miller, Kirkland, WA (US); Andrew John Peters, Sammamish, WA (US); Jeffrey Michael Derstadt, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 13/179,601

(22) Filed: Jul. 11, 2011

(65) Prior Publication Data
US 2012/0331484 A1 Dec. 27, 2012

Related U.S. Application Data (63) Continuation-in-part of application No. 13/166,825, filed on Jun. 23, 2011.

(51) Int. Cl.
*G06F 17/00* (2006.01)
*G06N 5/02* (2006.01)

(52) U.S. Cl.
USPC .......................................... 706/50

(58) Field of Classification Search
USPC .......................................... 706/50
See application file for complete search history.

(56) References Cited

U.S. PATENT DOCUMENTS

| | | | |
|---|---|---|---|
| 6,487,457 B1 | 11/2002 | Hull et al. | |
| 6,999,956 B2 | 2/2006 | Mullins | |
| 7,089,583 B2 | 8/2006 | Mehra et al. | |
| 7,383,285 B1 * | 6/2008 | Pal et al. | 1/1 |
| 7,421,436 B2 | 9/2008 | Salo et al. | |
| 7,577,681 B1 * | 8/2009 | Rozenman et al. | 1/1 |
| 7,676,493 B2 | 3/2010 | Pizzo et al. | |
| 7,734,659 B2 * | 6/2010 | Lori | 707/802 |
| 8,037,039 B2 * | 10/2011 | Perry et al. | 707/702 |
| 8,150,882 B2 * | 4/2012 | Meek et al. | 707/792 |

(Continued)

OTHER PUBLICATIONS

"Productivity Improvements for the Entity Framework", Retrieved from <<http://blogs.msdn.com/b/efdesign/archive/2010/06/21/productivity-improvements-for-the-entity-framework.aspx?PageIndex=2>>, Jun. 21, 2010, 7 Pages.

(Continued)

*Primary Examiner* — Michael B Holmes
(74) *Attorney, Agent, or Firm* — Ogilvie Law Firm (57) ABSTRACT

Fluent API Patterns promote balance in managing object persistence. Code which obtains an object-relational mapper session contains API Patterns that manipulate persistence ignorant objects using calls to a fluent interface. When the developer's code executes, it may manipulate an object state, a property state, and/or a persistent relationship of the persistence ignorant object. The code may implement API Patterns such as find-change-save, current-value-original-value, nested-property, incremental-graph-load, incremental-graph-filtered-load, property-modification, dictionary, and/or other API Patterns. Additional examples of API Patterns include an API Pattern to read current, original, and database values for all properties of an entity; an API Pattern to set current and/or original values from another object; and an API Pattern to create a cloned object containing current, original, and/or database values. In any or all of these situations, the API Pattern calls to the fluent interface may be written in a strongly typed language.

20 Claims, 2 Drawing Sheets

(56) References Cited

U.S. PATENT DOCUMENTS

| 8,392,462 | B2* | 3/2013 | Meek et al. | 707/792 |
|---|---|---|---|---|
| 2009/0024652 | A1 | 1/2009 | Thompson et al. | |
| 2010/0100427 | A1 | 4/2010 | McKeown et al. | |

OTHER PUBLICATIONS

Kraig Brockschmidt et al., "Microsoft Data Development Technologies: Past, Present, and Future", Retrieved from <<http://msdn.microsoft.com/en-us/library/ee730343(d=printer).aspx>>, Sep. 2010, 18 Pages.

"Object and Relational Mapping (ORM) With Hibernate", Retrieved from <<http://www.jboss.com/pdf/HibernateBrochure-03_07.pdf>>, Jun. 29, 2011 (Retrieved Date), 4 Pages.

Jeff Prosise, "Supporting Database Cache Dependencies in ASP. NET", Retrieved from <<http://msdn.microsoft.com/en-us/magazine/cc188758(printer).aspx>>, Apr. 2003, 7 Pages.

"EF Feature CTP4 Released!", Retrieved from <<http://blogs.msdn.com/b/adonet/archive/2010/07/14/ctp4announcement.aspx>>, Jul. 14, 2010, 5 Pages.

José Blakeley et al, "Next-Generation Data Access: Making the Conceptual Level Real", Retrieved from <<http://msdn.microsoft.com/en-us/library/aa730866%28v=vs.80%29.aspx>>, Jun. 2006, 22 Pages.

"FAQ :: Castle Project", Retrieved from <<http://www.castleproject.org/activerecord/faq.html>>, Retrieved Jul. 9, 2011, 4 Pages.

"LLBLGen Pro overview", Retrieved from <<http://www.llblgen.com/Pages/overview.aspx>>, Retrieved Jul. 9, 2011, 3 Pages.

"List of object-relational mapping software—Wikipedia, the free encyclopedia", Retrieved from <<http://en.wikipedia.org/wiki/List_of_object-relational_mapping_software>>, Jul. 4, 2011, 5 Pages.

Scott Guthrie, "Announcing Entity Framework Code-First (CTP5 release)—ScottGu's Blog", Retrieved from <<http://weblogs.asp.net/scottgu/archive/2010/12/08/announcing-entity-framework-code-first-ctp5-release.aspx>>, Dec. 8, 2010, 40 Pages.

Mario Aquino, "A Simple Data Access Layer using Hibernate", Retrieved from <<http://www.cnblogs.com/sunsonbaby/archive/2004/12/31/84998.html>>, copyright date 2003, 14 Pages.

"OpenAccess Features", Retrieved from <<http://www.telerik.com/products/orm/features.aspx>>, Jun. 29, 2011 (retrieved date), 13 Pages.

Jeremy Miller, "Design Patterns for Data Persistence", Retrieved from <<http://msdn.microsoft.com/en-us/magazine/dd569757(printer).aspx>>, Jun. 29, 2011 (retrieved date), 8 Pages.

"What is new in the Version 6.1 Feature Pack for EJB 3.0", Retrieved from <<http://publib.boulder.ibm.com/infocenter/wasinfo/v6r1/index.jsp?topic=/com.ibm.websphere.ejbfep.multiplatform.doc/info/ae/ae/welc_newinreleaseejbfp.html>>, Jun. 29, 2011 (Retrieved Date), 5 Pages.

"ADO.NET Entity Framework—Wikipedia, the free encyclopedia", Retrieved from <<http://en.wikipedia.org/wiki/ADO.NET_Entity_Framework>>, May 26, 2011, 10 Pages.

Arthur Vickers, "Code First: Inside DbContext Initialization", Retrieved from <<http://blog.oneunicorn.com/2011/04/15/code-first-inside-dbcontext-initialization/>>, Apr. 15, 2011, 5 Pages.

"EF 4.1 Code First Walkthrough", Retrieved from <<http://blogs.msdn.com/b/adonet/archive/2011/03/15/ef-4-1-code-first-walkthrough.aspx>>, Mar. 15, 2011, 8 Pages.

Martin Fowler, "FluentInterface", Retrieved from <<http://martinfowler.com/bliki/FluentInterface.html>>, Dec. 20, 2005, 3 Pages.

"Object database—Wikipedia, the free encyclopedia", Retrieved from <<http://en.wikipedia.org/wiki/Object_database>>, Jun. 16, 2011, 6 Pages.

"Object-relational mapping—Wikipedia, the free encyclopedia", Retrieved from <<http://en.wikipedia.org/wiki/Object-relational_mapping>>, Jun. 23, 2011, 3 Pages.

Edward Hieatt and Rob Mee, "Repository", Retrieved from <<http://www.martinfowler.com/eaaCatalog/repository.html>>, Jul. 1, 2011 (retrieved data), 2 Pages.

"Unit of Work", Retrieved from <<http://www.martinfowler.com/eaaCatalog/unitOfWork.html>>, Jul. 1, 2011 (retrieved data), 2 Pages.

"Persistence (computer science)—Wikipedia, the free encyclopedia", Retrieved from <<http://en.wikipedia.org/wiki/Persistence_(computer_science)>>, May 9, 2011, 3 Pages.

"Using DbContext in EF 4.1 Part 5: Working with PropertyValues", Retrieved from <<http://blogs.msdn.com/b/adonet/archive/2011/01/30/using-dbcontext-in-ef-feature-ctp5-part-5-working-with-property-values.aspx>>, Jan. 30, 2011, 9 Pages.

"Using DbContext in EF 4.1 Part 6: Loading Related Entities", Retrieved from <<http://blogs.msdn.com/b/adonet/archive/2011/01/31/using-dbcontext-in-ef-feature-ctp5-part-6-loading-related-entities.aspx>>, Jan. 31, 2011, 7 Pages.

"When is Code First not code first?", Retrieved from <<http://blogs.msdn.com/b/adonet/archive/2011/03/07/when-is-code-first-not-code-first.aspx>>, Mar. 7, 2011, 4 Pages.

* cited by examiner

FLUENT API PATTERNS FOR MANAGING OBJECT PERSISTENCE

CROSS REFERENCE TO RELATED APPLICATIONS

This application is related to the following applications: U.S. patent application Ser. No. 13/166,825 filed 23 Jun. 2011 entitled "Conventions for Inferring Data Models" as well as the following applications co-filed with the present application: U.S. patent application Ser. No. 13/179,914 filed Jul. 11, 2011, U.S. patent application Ser. No. 13/179,598 filed Jul. 11, 2011, and U.S. patent application Ser. No. 13/179,629 filed Jul. 11, 2011.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Objects and other items which are created or modified during execution of some piece of software can persist beyond the end of that execution if they are stored in a non-volatile medium, such as a flash memory or a hard drive. Object persistence is sometimes a topic of interest in persistent operating systems, or in software that utilizes object databases or object-relational mapping, for example. Although object-relational mapping software is used as a primary example herein, objects, persistence, fluency, API patterns, and other aspects of the discussion are sometimes relevant to other kinds of software, such as persistent operating systems that utilize objects.

An object-relational mapping can be used to convert data between an object model of an object-oriented program and a relational database. The mapping is performed, at least in part, by a tool known as an object-relational mapper. The acronym ORM is used herein to denote the mapping tool, the mapping itself, or both.

An ORM is useful because data in the object model is organized in non-scalar items, whereas data in the relational database is organized in scalar items. Integers, floating point values, and strings are examples of scalar values; structs, records, and object instances are examples of non-scalar values. An object model includes objects (class instances) which are frequently non-scalar values. In addition to multiple associated data values, an object may have associated methods, such as methods to set or get the data values or perform other operations. Many familiar database systems, including many structured query language database management systems, store and manipulate only scalar values, which are organized within tables. An ORM helps convert object values into groups of scalar values for persistent storage in the database, and convert those scalar values back into objects upon retrieval from the database. Thus, an ORM helps translate a logical representation of objects into a form that can be stored persistently in a relational database, without losing track of object properties and inter-relationships.

SUMMARY

In the course of developing a product which uses object-relational mapping, a developer can benefit both from the use of a persistence framework to access non-volatile storage and from the use of objects which are independent of the persistence framework. In particular, developers may be assisted by a balance between separating persistence concerns from domain objects in a business logic layer, on the one hand, and managing persistence in the same object classes when working in a persistence layer, on the other hand. Some embodiments described herein help provide such a balance, by supporting use of fluent API Patterns for managing object persistence.

Some embodiments provide API-Pattern-based tools and techniques for using persistable objects. For example, in some approaches a developer writes code that (when run) obtains a session from an object-relational mapper (ORM) and also writes code containing an API pattern which (when run) manipulates a mapped persistence ignorant object using calls to a fluent interface. For convenience, a session is sometimes called an "ORM session", a "unit of work", a "context", or a "context instance". When the developer's code executes, it may manipulate an object state, a property state, and/or a persistent relationship of the persistence ignorant object.

Several examples of API Patterns follow, beginning with labeled API Patterns, namely, API Patterns which are given a label herein for convenient reference. The code may implement a find-change-save API Pattern to find or verify that the object's state is unchanged, then change the object's state to indicate deletion, and then save the session. The label of the find-change-save API Pattern is "find-change-save". The code may implement a current-value-original-value API Pattern to access and manipulate both a current value and an original value of an object. The label of this API Pattern is "current-value-original-value", and so on with other labeled API Patterns. The code may implement a nested-property API Pattern to access and manipulate a non-scalar property that depends on the containing object for persistence.

Sometimes multiple persistable objects are defined in a session and are related to one another by references, forming a graph. "Graph" is used here in a broad sense, to include lists, trees, sets, and other data structures which are built using objects (as nodes) and object references (as links). The code may implement an incremental-graph-load API Pattern to incrementally load portions of a graph into volatile memory. In some of these cases the code may load portions of a graph based on a filtering predicate, according to an incremental-graph-filtered-load API Pattern. The code may implement a property-modification API Pattern to check whether a property is marked as modified and/or to mark a property as modified. The code may implement a dictionary API Pattern to set current and/or original values of the object from a dictionary.

Other API Patterns are not labeled but are also discussed. Some examples include an API Pattern to read current, original, and database values for all properties of an entity; an API Pattern to set current and/or original values from another object; and an API Pattern to create a cloned object containing current, original, and/or database values. In any or all of the situations described above (with labeled or with unlabeled API Patterns), the developer's code may be written in a strongly typed language.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Persistence Ignorance support is sometimes a desirable characteristic of object persistence systems, such as Object/Relational Mappers (ORMs). Persistence ignorance involves removing from business logic/subject domain classes any dependency to a persistence framework. Such dependency removal (or equivalently, avoidance of dependency) allows for layered architectures in which business logic can be developed without paying significant attention to the implementation of persistence. As a result, developers may benefit by gaining flexibility, simplicity and maintainability for business logic code.

On the other hand, persistence aware objects usually offer a simpler programming surface for aspects that are closely related to persistence, by allowing for direct manipulation in the object instances of aspects such as (i) a persistence state of an object (e.g., whether the object is to be added, updated, deleted from the database), (ii) original value(s) of properties and whether a property should be considered modified, (iii) control of persistent relationships with other objects (e.g., whether an object on the other side of a reference has been loaded into volatile memory).

Some familiar approaches which offer control for persistence ignorant objects contain complex Application Program Interfaces (APIs) that concentrate a large number of concepts in very few abstractions. A challenge is present, in that although it is often desirable to separate persistence concerns from domain objects while developing the business logic layer, those aspects naturally belong to the same object instances when working at the persistence layer. Another shortcoming of some familiar approaches is that their sophisticated programming interfaces for change tracking and relationship management usually do not provide strong typing. Without strong typing, it is difficult if not impossible to obtain the benefits of compile-time checking of the persistence logic code.

Some embodiments described herein help meet the foregoing challenge, and reduce or overcome familiar shortcomings. API Patterns described in this document provide most of the same simplicity in manipulating change tracking and relationship that persistence aware objects often provide, while preserving for developers some very useful capabilities for working with persistence ignorant objects. In particular, some embodiments provide and/or utilize a fluent API pattern for change tracking and relationship management of persistence ignorant objects. In some, application programming interfaces look and behave like the ones under DbContext.Entry, i.e., with fluent interfaces that provide simple and strongly typed access to object persistence information associated with objects, without requiring the objects themselves to be aware of persistence. Some achieve this by taking advantage of lambda expressions, type inference and generics support.

Some embodiments described herein may be viewed in a broader context. For instance, concepts such as APIs generally, API patterns generally, object-relational mapping, interface fluency, objects, and/or persistence may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving APIs generally, API patterns generally, object-relational mapping, interface fluency, objects, and/or persistence, for example, are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

A "graph" is a structure having nodes connected (or designed to be connectable during program execution) by links. Trees, linked lists, hash tables, and many other familiar data structures are examples of graphs. Links may be implemented using pointers or other references, and nodes may be implemented using structs or objects, for example.

A "session" or "ORM session" (sometimes referred to as a "data context", "data context instance", or "unit of work") can be described as a primary entry point to an object-relational mapper. The session manages a connection to a relational database. Using this connection the session allows data to be queried from the database and materialized into objects. The session keeps track of modifications to these objects, allows for adding new objects and deleting existing objects, and orchestrates the writing of these changes back to the database. The session may also provide mechanisms to examine the objects that are being tracked and the relationships between them and to manipulate these objects, their state, and their relationships.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)" or "(es)" means that one or more of the indicated feature is present. For example, "API Pattern(s)" means "one or more API Patterns" or equivalently "at least one API Pattern".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, ascertaining, calling, causing, chaining, changing, checking, configuring, creating, executing, filtering, finding, forming, inspecting, loading, manipulating, marking, modifying, obtaining, reading, receiving, saving, setting, specifying, verifying, writing (or accesses, ascertains, calls, causes, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a signal on a wire, for example.

Operating Environments

Figure 1:
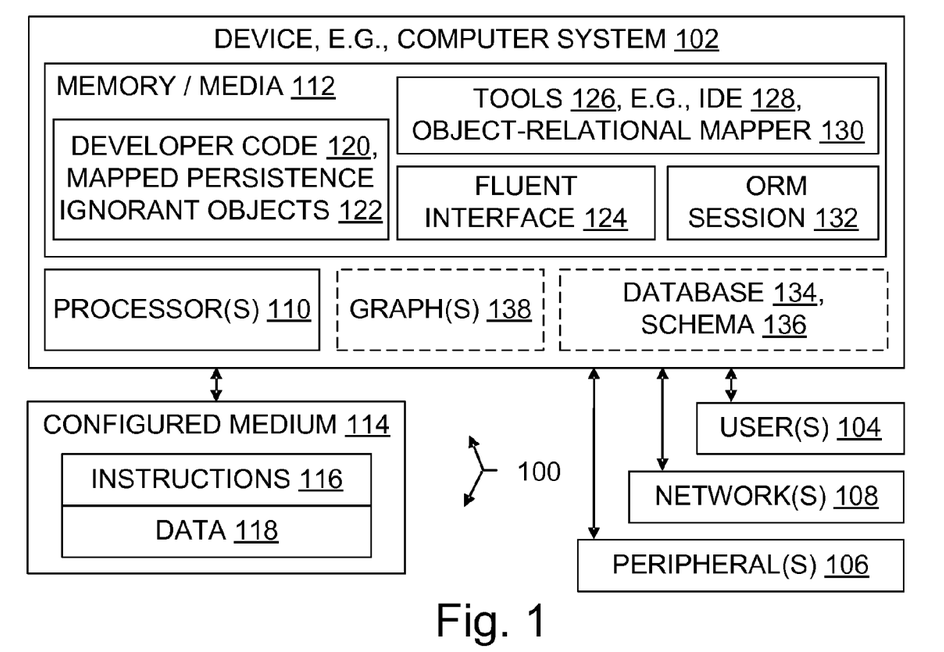
FIG. 1 is a block diagram illustrating a computer system having at least one processor, at least one memory, an object-relational mapper and/or an object-relational mapping (ORM), developer code (source, bytecode, object code and/or executable at a given time), and other items in an operating environment which may be present on multiple network nodes, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106. System administrators, database administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, and/or optical media, as opposed to media such as a wire that merely propagates a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed as discussed herein, e.g., by creation, deployment, display, execution, loading, mapping, modification, setting and/or other operations.

Developer code 120 with objects 122, a fluent interface 124 to a persistence management framework, tools 126 such as an IDE 128 and an object-relational mapper 130, other software, an ORM session 132, and other items shown in the Figures and/or discussed in the text may reside partially or entirely within one or more media 112, thereby configuring those media. A database 134 and associated schema 136 (considered in some approaches to be part of the database) may be present on one or more machines in the system 102. Graphs 138 having objects 122 as nodes may also be present, in non-volatile and/or volatile storage media on one or more machines. In addition to processors 110 and memory 112, an operating environment may also include other hardware such as displays, buses, power supplies, and accelerators, for instance.

In some embodiments, the ORM session 132 takes the form of a Microsoft® DbContext class (or equivalently herein, class instance), which provides the main entry point for working with the Object/Relational Mapper 130 in Microsoft's Entity Framework technology (version 4.1), for example (mark of Microsoft Corporation). The ORM session 132 implements a familiar Unit of Work pattern and also includes elements of a familiar Repository pattern.

As indicated, a given operating environment 100 may include an Integrated Development Environment (IDE) 128 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se that use ORM applications (i.e., applications with code 120 utilizing an ORM session 132).

Items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

To further illustrate the operating environment of some embodiments, several aspects of a more comprehensive solution will now be discussed, with the understanding that not every feature or capability discussed is necessarily present in a given embodiment.

User Classes

As part of creating an application an application developer 104 creates an object model containing data classes for objects 122, and a data context (session 132). For example, a simple data model might consist of two entity types—one representing products and the other representing categories to which products belong. Using C# developer code 120 as an example (the programming language is not dispositive), the classes might look like this:

```
public class Product
{
    public int Id { get; set; }
    public string Name { get; set; }
    public Category Category { get; set; }
}
public class Category
{
    public string Id { get; set; }
    public ICollection<Product> Products { get; set; }
}
```

The exact nature of the classes is not important. These are simple classes that do not derive from any special base type, implement any interfaces, or have any required attributes, and that use simple automatic properties. These classes represent the object model for the application.

In an Entity Framework environment, the application developer also writes a data context (ORM session 132) that derives from the provided DbContext base class. For example:

```
public class MyContext : DbContext
{
    public DbSet<Product> Products { get; set; }
}
```

This developer code 120 is sufficient to create the data access part of an application. Also, the application developer can avoid adding any other configuration to non-code files. For example, adding a connection string to the application configuration file can be skipped.

Initialization of the ORM Session DbSet Properties

When an instance of the ORM session 132 (e.g. MyContext) is created it is scanned for all DbSet properties that have public set methods to assign values. Each of these methods is called automatically to set the property to an instance of the implicated collection or other group. This removes the burden from the application developer of creating and setting DbSet instances for their session and allows the context to be written with simple automatically identified properties. The application developer can disable automatic initialization of sets for some or all sets if the application needs to use some special form of initialization.

Discovering the Database Connection

The first time that an instance of the ORM session (e.g. MyContext) is used a connection to an underlying database 134 is created. If no configuration is supplied then a convention is used to create the connection. A default convention uses the name of the context as the database name and connects to an instance of SQL Server® Express edition or another database management solution running on the local machine (mark of Microsoft Corporation). This convention can be changed to create connections to any other type of database for which an Entity Framework provider is available, on any machine, for example. The convention can be overridden by the application developer in a number of ways, such as allowing a connection from the application's configuration file to be used.

Discovering the Data Model

The first time that an instance of the ORM session (e.g. MyContext) is used, the data model for that ORM session 132 is discovered automatically. The data model used can be an Entity Data Model (EDM) as supported by the Microsoft® Entity Framework, or another form of data model could be used. If the connection created contains a data model specification already, then the data model specified is used and data model discovery ends.

If the connection does not contain a data model specification, then the DbSet properties of the ORM session 132 are used as the basis for discovering an object model which is then in turn used to create a data model. The generic type of each DbSet property is used to define an entity type of the object model. For example, using MyContext defined above, the type Product is discovered as an entity type in the model. Discovery mechanisms are then used to discover the remainder of the object model and create a data model from it. Known mechanisms may be used such that all types, properties, and relationships of the model are discovered. For example, using the object model above, Category is also discovered as an entity type through its reachability from Product. In this example, the object model discovered and the data model created from it therefore include the Product and Category entity types, the relationship between these types, and the properties of these types.

The application developer may be allowed to make changes to the data model before it is finalized. This allows application developers to use as much of the automatic mechanism as possible and only make changes where their goals are different from the defaults. Notably, a developer is not called on to configure everything manually merely because some aspect of their model does not match the defaults.

Caching the Data Model

In some cases, the data model created by the above steps is cached in an application-domain-wide cache, keyed by the type of the application's data context. This cache is checked each time that an instance of the ORM session is created, and if a data model is found in the cache then it is used instead of going through the entire discovery process again. This caching helps ensure that applications run fast enough while using the steps described above. An application developer can create and cache the data model manually if the default model discovery and caching does not meet the developer's goals.

Initializing the Database

The application developer can set a database initializer to be run the first time an instance of an ORM session is used with a given model and connection in the application domain (Common Language Runtime application domains and app-domains are examples of an application domain). In some embodiments, the default initializer automatically creates the database and schema if it does not already exist. However, different initializers can be configured to allow actions such as: creating the database and/or schema automatically; tweaking the database by configuring options such as indexes; migrating an existing database and schema to match the data model; or seeding the database with data. In general, custom initializers may perform any actions the application developer indicates, to get the database into a state where it can be used by the application. Database initialization can also be disabled if it is not appropriate for the application.

With a solution along the lines described above, an application developer merely writes simple classes for the data model and ORM session, and then uses an instance of that session in order to create a fully functional application backed by a relational database. In addition, the developer can easily intercede at any point in the development process to add customizations as appropriate for their application. Such ease and flexibility can provide significant benefits in the creation of data applications.

Systems

Figure 2:
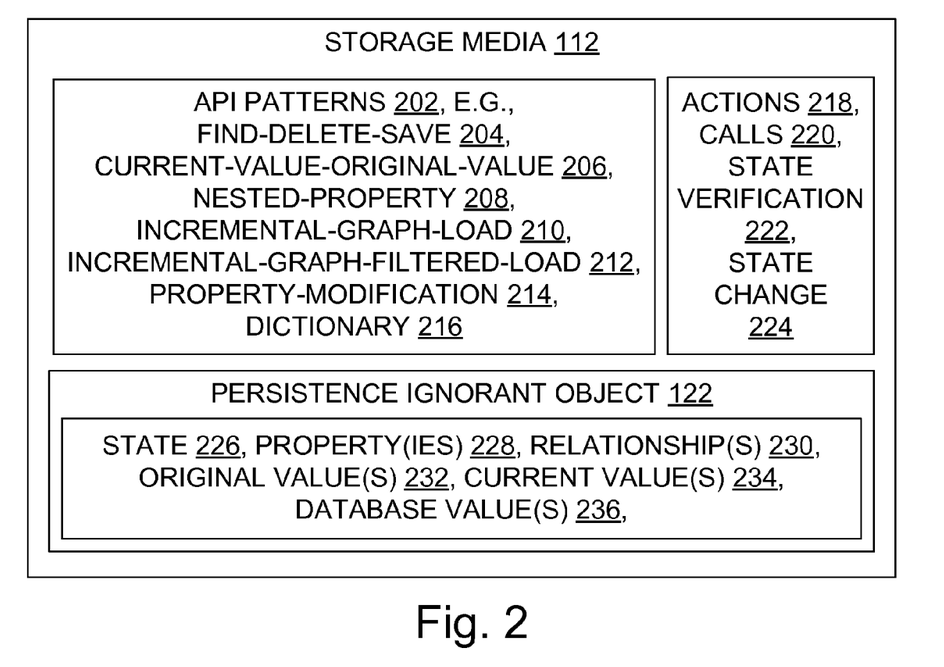
FIG. 2 is a block diagram illustrating API Patterns for managing persistence ignorant objects in an example architecture.

FIG. 2 illustrates an architecture which is suitable for use with some embodiments, including various API Patterns 202. "API Patterns" with a capital P designates the patterns described herein, whereas "API patterns" with a lowercase p refers to API patterns generally, such as familiar API patterns. API Patterns 202 may be labeled or unlabeled. Labeled API Patterns 202 shown in FIG. 2 include find-delete-save 204, current-value-original-value 206, nested-property 208, incremental-graph-load 210, incremental-graph-filtered-load 212, property-modification 214, and dictionary 216 API Patterns. The labeled API Patterns of FIG. 2 are not the only API Patterns of interest; other API Patterns 202, not labeled, are also discussed herein.

API Patterns 202 provide sequencing, subject matter, and/ or other constraints as discussed herein, thereby structuring actions 218 on objects 122. Possible actions 218 may include, for example, calls 220 to object persistence framework interface(s) 124 in a session 132, object state verifications 222, and object state changes 224. Interface 124 calls 220 and other actions 218 can read and/or write an object's persistence state 226, an object's property(ies) 228, an object's persistence relationship(s) 230 with other objects, and/or an object's values, namely, its original value(s) 232, current value(s) 234, and/or database value(s) 236.

With reference to FIGS. 1 and 2, some embodiments provide a computer system 102 with a logical processor 110 and a memory medium 112 configured by circuitry, firmware, and/or software to transform an operating environment by API Pattern-based persistence management as described herein.

Some embodiments include a computer system with a logical processor 110, a memory 112 in operable communication with the logical processor, and an object-relational mapping session 132 residing in the memory. A mapped persistence ignorant object 122 also resides in the memory, and has at least one state 226 as part of the session 132. A fluent interface 124 to the persistence framework of the session 132 also resides in the memory. A developer code 120 residing in the memory contains an API Pattern 202. Upon execution, the developer code 120 manipulates the mapped persistence ignorant object 122 using calls 220 to the fluent interface 124. The calls 220 are not constrained merely by the fluent interface 124, but are also structured in (i.e., in conformance with) the API Pattern 202.

In some embodiments, the API Pattern 202 is a find-delete-save API Pattern 204, namely, an API Pattern which specifies a verification 222 that the object's state 226 is unchanged, a post-verification change 224 to the object's state 226 to indicate deletion, and a post-change action 218 to save the session 132 to non-volatile storage.

In some embodiments, the API Pattern 202 is a current-value-original-value API Pattern 206, namely, an API Pattern which specifies an action 218 on a current value 234 of the object 122 and also specifies an action 218 on a corresponding original value 232 of the object.

In some embodiments, the object 122 is a containing object in that the object 122 contains a non-scalar property 228 which depends on the object 122 for persistence. In some of these, the API Pattern 202 is a nested-property API Pattern 208, namely, an API Pattern which specifies an action 218 on the non-scalar property.

In some embodiments, multiple persistable objects 122 reside in the memory 112 and are related to one another by references, thereby forming a graph 138. In some of these, the API Pattern is an incremental-graph-load API Pattern 210, namely, an API Pattern which specifies incrementally loading portions of the graph 138 (and hence object 122 node(s) of the graph) into volatile memory 112.

In some embodiments, multiple persistable objects 122 reside in the memory 112 and are related to one another by references, thereby forming a graph 138, as above. In some of these, however, the API Pattern is an incremental-graph-filtered-load API Pattern 212, namely, an API Pattern which specifies incrementally loading portions of the graph 138 into volatile memory 112 based on a filtering predicate. The filtering predicate may filter objects in or out of the group of objects to load, based on object state 226, property(ies) 228, relationship(s) 230, and/or value(s) 232, 234, 236.

In some embodiments, the API Pattern 202 is a property-modification API Pattern 214, namely, an API Pattern which specifies at least one of the following actions 218 on a property 228 of the object 122: checking whether the property is marked as modified, marking the property as modified.

In some embodiments, the API Pattern 202 is a dictionary API Pattern 216, namely, an API Pattern which specifies at least one of the following actions 218 on the object 122: setting a current value 234 of the object from a dictionary, setting an original value 232 of the object from a dictionary.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, databases 134 may be stored on multiple devices/systems 102 in a networked cloud, the object-relational mapper 130 may be stored on yet another device within the cloud, and the application code 120 under development may configure the display on yet other cloud device(s)/system(s) 102.

Processes

Figure 3:
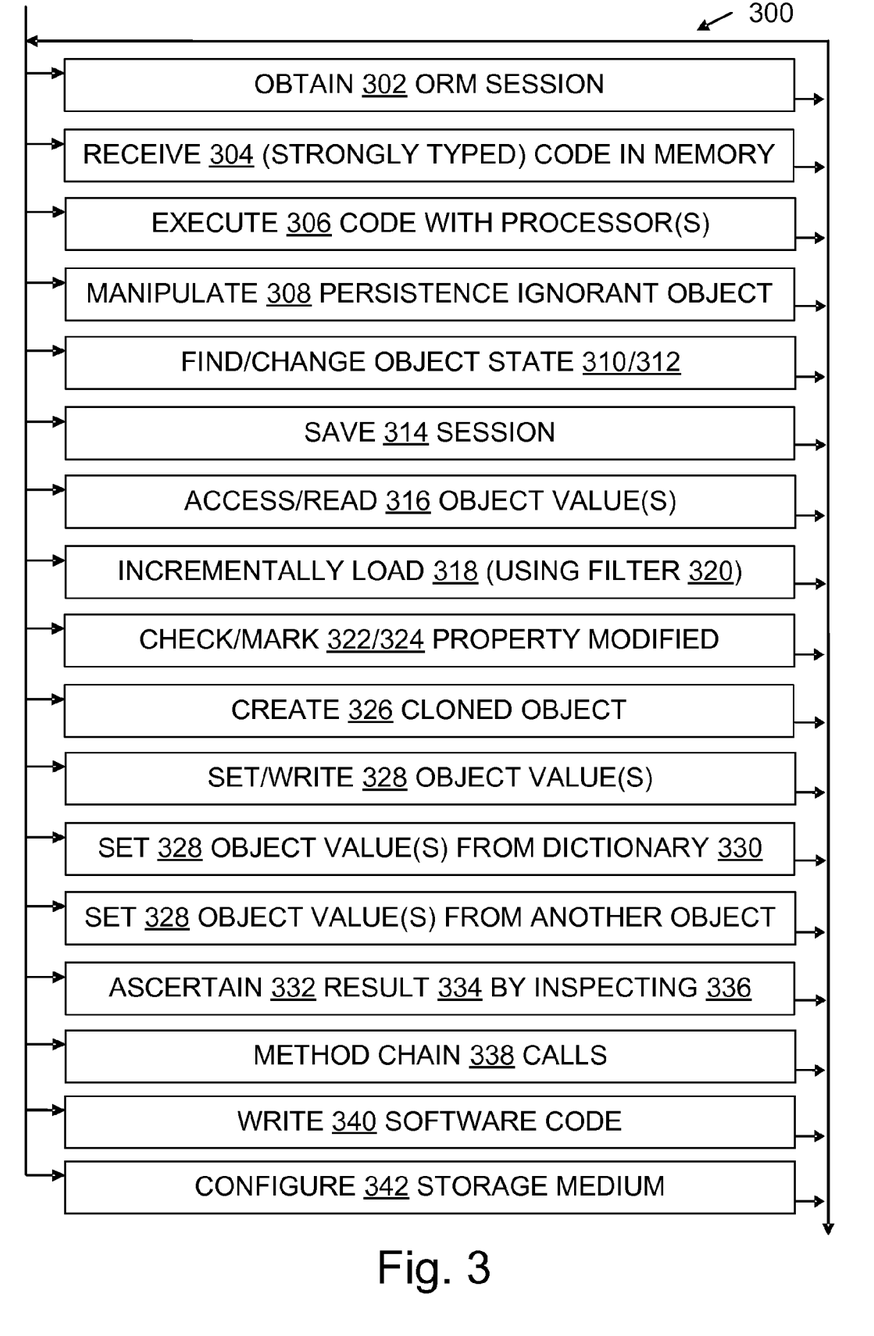
FIG. 3 is a flow chart illustrating steps of some process and configured storage medium embodiments, from a persistence management tool perspective and/or from a developer perspective.

FIG. 3 illustrates some process embodiments in flowchart 300. Processes shown in the Figure may be performed in some embodiments automatically, e.g., by a comprehensive solution which obtains an ORM session, receives suitable code by reading a specified file, and executes the code, in a process driven automatically by the launching of an application whose code is under development. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a given process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a session obtaining step 302, an embodiment obtains an ORM session 132 from an object-relational mapper 130 or other known source, using known mechanisms, for example.

During a code receiving step 304, an embodiment receives code 120, e.g., through an IDE 128 and/or using mechanisms controlled by a developer 104 such as an editor or filesystem. In some cases, the code 120 is strongly typed, that is, the code is amenable to automated type checking prior to its execution.

During a code executing step 306, an embodiment executes code 120 or a portion thereof. Familiar code execution mechanisms may be used.

During an object manipulating step 308, an embodiment manipulates one or more aspects of an object 122, such as aspect(s) 226-236 shown in FIG. 2, using call(s) 220 and API pattern(s). In a given situation, API Pattern(s) 202, other API patterns, fluent interface(s) 124, other interfaces, and/or familiar ORM mechanisms may be used, in a manner consistent with the descriptions of object manipulation herein.

During an object state finding step 310 (which may be viewed in some cases as a verifying step 310), an embodiment finds (e.g., examines or confirms) an object's state 226. API Patterns 202, fluent interface 124 calls 220, and familiar ORM mechanisms may be used, in a manner consistent with the descriptions of object manipulation herein.

During an object state changing step 312, an embodiment changes an object's state 226. API Patterns 202, fluent interface 124 calls 220, and familiar ORM mechanisms may be used, in a manner consistent with the descriptions of object manipulation herein.

During a session saving step 314, an embodiment saves a copy of an ORM session 132 and associated data 118 to a non-volatile storage medium. Familiar ORM mechanisms may be used, in a manner consistent with the descriptions of object manipulation herein.

During an object value accessing step 316, also referred to as object value reading step 316, an embodiment reads an object's value, namely an original value 232, a current value 234, or a database value 236. API Patterns 202, fluent interface 124 calls 220, and familiar ORM mechanisms may be used, in a manner consistent with the descriptions of object manipulation herein.

During an incremental loading step 318, an embodiment loads into a volatile memory destination a proper subset of a graph 138 containing object(s) 122. Loading 318 may read object(s) 122 from non-volatile memory or from a remote networked location, for example. API Patterns 202, fluent interface 124 calls 220, and familiar ORM mechanisms may be used, in a manner consistent with the descriptions of object manipulation herein.

During a filtering step 320, a filter predicate (also denoted 320) is applied to limit which object(s) of the graph 138 are loaded into the destination during step 318. Filtering 320 may be implemented by not retrieving filtered-out objects at all from non-volatile storage, or by not transferring them from a volatile buffer to the volatile destination, for example.

During an object property checking step 322, an embodiment checks an object's property state to see whether the property 228 has been marked as modified since the last save to non-volatile memory. API Patterns 202, fluent interface 124 calls 220, and familiar ORM mechanisms may be used, in a manner consistent with the descriptions of object manipulation herein.

During an object property marking step 324, an embodiment marks an object's property state to indicate that the property 228 has been modified since the last save to non-volatile memory. API Patterns 202, fluent interface 124 calls 220, and familiar ORM mechanisms may be used, in a manner consistent with the descriptions of object manipulation herein.

During an object clone creating step 326, also referred to as object cloning 326, an embodiment makes a clone object which contains a copy of the aspects 226-236 of another object 122. API Patterns 202, fluent interface 124 calls 220, and familiar ORM mechanisms may be used, in a manner consistent with the descriptions of object manipulation herein.

During an object value setting step 328, also referred to as object value writing step 328, an embodiment writes an object's value, namely an original value 232, a current value 234, or a database value 236. In particular, an embodiment may set 328 object value(s) 232-236 using values read from a dictionary 330 and/or from another object 122. API Patterns 202, fluent interface 124 calls 220, and familiar ORM mechanisms may be used, in a manner consistent with the descriptions of object manipulation herein.

During an ascertaining step 332, a user (or an embodiment operating on behalf of a user) ascertains a result 334 of execution 306 of code, e.g., by viewing log information, or by otherwise inspecting 336 aspect(s) 226-236 of an object 122 in an IDE 128, monitor, or other tool 126, using windows, logs, breakpoints, and/or other mechanisms, for example.

During a method chaining step 338, a user (or an embodiment operating on behalf of a user) chains together calls 220 in code 120. Method chaining passes a result of one call directly into a subsequent call within a single line or statement of code, rather than discarding the call result or ending the line or statement by saving the first call's result in a named variable, for example. In method chaining 338 which is done in or with an embodiment, API Patterns 202, fluent interface 124 calls 220, and familiar ORM mechanisms may be used, in a manner consistent with the descriptions of object manipulation herein.

During a code writing step 340, a user (or an embodiment operating on behalf of a user) writes software code, such as a portion of application code 120, using a programming language, an IDE 128 or other editing tool 126, and/or other mechanisms, for example.

During a memory configuring step 342, a memory medium 112 is configured by an API Pattern 202, by a manipulation 308 of object persistence, or otherwise in connection with object 122 persistence management as discussed herein.

The foregoing steps and their interrelationships are discussed in greater detail below, in connection with various embodiments.

Some embodiments provide a process for managing object persistence, which is described now from a computer process perspective. In some embodiments, the process includes obtaining 302 an ORM session 132 from an object-relational mapper 130, and receiving 304 in a memory a code 120 which contains calls 220 to a fluent interface 124 in an API Pattern 202. The code is executed 306 with at least one processor 110. In the course of executing the code, the process automatically manipulates 308 a persistence ignorant object 122 within the ORM session 132, in a manner consistent with the API Pattern 202. Some embodiments receive 304 a code which contains calls 220 to a fluent interface written in a strongly typed language.

In some embodiments, executing 306 the code manipulates 308 at least one of the following: a state 226 of the persistence ignorant object 122, a property 228 state (e.g., whether marked 324 as modified) of the persistence ignorant object 122, a persistent relationship 230 of the persistence ignorant object 122.

In some embodiments, executing 306 the code 120 includes manipulating 308 a persistence ignorant object 122 in at least some specified number of the API Pattern constituents listed below. The specified number is any integer ranging from one to eleven if all eleven constituents are considered of interest, and a corresponding smaller integer (the number of constituents) if a proper subset—a smaller number—of constituents is considered, which occurs in some embodiments. A given embodiment need not be capable of performing all constituents that are considered of interest; it need only be capable of the specified number of those constituents.

API Pattern constituents which may be of interest include:
  i. finding 310 that a state 226 of the object 122 is unchanged, then changing 312 the object's state to indicate deletion, and then saving 314 the session 132;
  ii. accessing 316 both a current value 234 and an original value 232 of the object 122;
  iii. accessing 316 a non-scalar property 228 that depends on the containing object 122 for persistence;
  iv. incrementally loading 318 into volatile memory portions of a graph 138 containing the object 122 (the loaded portion contains the object);
  v. incrementally loading 318 into volatile memory, based on a filtering predicate (filter 320), portions of a graph containing the object 122;
  vi. checking 322 whether a property 228 of the object 122 is marked 324 as modified;
  vii. marking 324 a property 228 of the object 122 as modified;
  viii. reading 316 current, original, and database values 232-236 for all properties 228 of an object 122;

ix. setting 328 current and/or original values of the object 122 from another object;

x. setting 328 current and/or original values of the object 122 from a dictionary 330;

xi. creating 326 a cloned object containing current, original, and/or database values of the object 122.

We turn now to discussion of embodiments a developer may perform for managing object persistence. Some embodiments include writing 340 in a piece of software a portion of code 120 for obtaining 302 an ORM session 132 from an object-relational mapper 130, and writing 340 in the software another portion of code 120 which contains an API Pattern 202 that includes calls 220 to a fluent interface 124 for manipulating a mapped persistence ignorant object 122. The process also includes causing execution 306 of the codes by a computer system 102, and ascertaining 332 a result of the execution by inspecting 336 the object.

Some embodiments include writing 340 code which contains a specified number (from one to the number of API Patterns of interest) of labeled API Patterns. For example, some embodiments include writing 340 code which contains fluent interface calls in at least three of the seven API Patterns 204-216. In some embodiments, writing 340 code includes method chaining 338 calls of the fluent interface 124.

In some embodiments, inspecting 336 the object includes reading a single value, while in other embodiments inspection 336 involves reading multiple values, e.g., reading both a current value 234 of the object and a corresponding original value 232 of the object.

Configured Media

Some embodiments include a configured computer-readable storage medium 112. Medium 112 may include disks (magnetic, optical, or otherwise), RAM, EEPROMS or other ROMs, and/or other configurable memory devices, as opposed to wires and other propagated signal media. The storage medium which is configured may be in particular a removable storage medium 114 such as a CD, DVD, or flash memory. A general-purpose memory, which may be removable or not, and may be volatile or not, can be configured into an embodiment using items such as API Patterns in code and fluent interfaces to persistence frameworks, in the form of data 118 and instructions 116, read from a removable medium 114 and/or another source such as a network connection, to form a configured medium. The configured medium 112 is capable of causing a computer system to perform process steps for transforming data through object persistence management as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing technological context and/or by illustrating some of the many possible implementations and developer utilizations of the API Patterns and associated technologies discussed herein.

The following discussion is derived in part from Entity Framework documentation. Entity Framework includes software implemented by Microsoft Corporation. Aspects of the Entity Framework software and/or documentation are consistent with or otherwise illustrate aspects of the embodiments described herein. However, it will be understood that Entity Framework documentation and/or implementation choices do not necessarily constrain the scope of such embodiments, and likewise that Entity Framework and/or its documentation may well contain features that lie outside the scope of such embodiments. Nor is any released or development version of Entity Framework necessarily consistent with the documentation below. It will also be understood that the discussion below is provided in part as an aid to readers who are not necessarily of ordinary skill in the art, and thus may contain and/or omit details whose recitation below is not strictly required to support the present disclosure.

Fluent API Patterns for Managing Object Persistence

From a developer's point of view, some embodiments provide tools and techniques for using persistable objects 122. For example, in some approaches the developer writes 340 code that (when run) obtains an ORM session 132 from an object-relational mapper and then writes 340 code containing an API Pattern 202 which (when run) manipulates 308 a mapped persistence ignorant object using calls to a fluent interface 124. A DbContext instance is an example of an ORM session 132. An ORM session may also be called a "unit of work" or a "context". An Entity Framework entity is an example of a persistence ignorant object 122.

In particular, when the developer's code executes, it may manipulate 308 an object state, a property state, and/or a persistent relationship of the persistence ignorant object.

As a specific example, upon execution the code 120 may find that the object's state is unchanged, then change to object's state to indicate deletion, and then save the session. An example of this is given below under the heading "Manipulating persistence state".

As another specific example, the code may access 316 and manipulate 308 both a current value and an original value of an object. An example of this is given below under "Manipulating current and original values of properties".

As another specific example, the code may access 316 and manipulate 308 a non-scalar property that depends on the containing object for persistence. An example of this is given under "Manipulating nested properties".

As another specific example, suppose multiple persistable objects 122 are defined and are related to one another by references, forming a graph 138. "Graph" is used in a broad sense, to include lists, trees, sets, and other data structures which are built using objects and object references. The code may incrementally load 318 portions of a graph into volatile memory. An example of this is given under "Manipulating relationships". As illustrated by a second example in that same section, in some of these cases the code may load portions of a graph based on a filtering predicate 320.

Other specific examples given below include checking 322 whether a property is marked as modified; marking 324 a property as modified; reading 316 current, original, and database values for all properties of an entity; setting 328 current or original values from another object; setting 328 current or original values from a dictionary; setting 328 current or original values from a dictionary using Property; and creating 326 a cloned object containing current, original, or database values.

In any or all of the situations described above, the developer's code 120 may be written in a strongly typed language.

Additional Background

A familiar criterion in an Object/Relational Mapper is that persistable objects be persistence ignorant, meaning that they don't have any dependency with the persistence framework, i.e., they do not derive from a class or implement an interface defined by the persistence framework, and need not present any specific pattern in order to be used with the persistence framework.

For example, a simple data model might consist of two entity types—one representing products and the other representing categories to which products belong. Using C# code as an example, the classes might look like this:

```
public class Product
{
    public int Id { get; set; }
    public string Name { get; set; }
    public decimal Price { get; set; }
    public Category Category { get; set; }
}
public class Category
{
    public string Id { get; set; }
    public ICollection<Product> Products { get; set; }
}
```

These classes represent the object model for the application.

When using Entity Framework, an application developer can also write a context class (session 132) that derives from the provided DbContext base class. DbContext provides a starting point for querying and manipulating persistable objects in Entity Framework. For example:

```
public class CatalogContext: DbContext
{
    public DbSet<Product> Products { get; set; }
    public DbSet<Category> Categories { get; set; }
}
```

Entity "entries"

DbContext provides Entry<T>( ) and Entry( ) methods that return instances of DbEntityEntry<T> and (non-generic) DbEntityEntry instances representing the "unit of tracking" for an entity instance inside the persistence framework. This "entry" abstraction provides a starting point into a fluent interface 124 for manipulating object state, property state and persistent relationships. The "entry" of a persistable object provides equivalent functionality to the one often found in methods and properties in a persistence aware object, but can be applied to persistence ignorant objects.

Manipulating Persistence State

In order to change the state of a Product with Id equal to productId to "deleted" and save, it is possible to write the following C# code, which includes an example of a find-delete-save API Pattern 202:

```
using(var context = new CatalogContext( ))
{
    var product = context.Products.Find(productId);
    Debug.Assert(context.Entry(product).EntityState ==
        EntityState.Unchanged);
    context.Entry(product).EntityState = EntityState.Deleted;
    context.SaveChanges( );
}
```

Manipulating Current and Original Values of Properties

In a similar way, it is possible to use this "entity entry" abstraction to have access to and manipulate 308 the current and original values for an entity, as occurs for instance in this code with an example of a current-value-original-value API Pattern 202:

```
using(var context = new CatalogContext( ))
{
    var product = context.Products.Find(productId);
    context.Entry(product).Property(p =>
        p.ProductName).CurrentValue = "Soda";
    Debug.Assert(context.Entry(product).Property(p =>
        p.ProductName).OriginalValue == "Water");
    Debug.Assert(context.Entry(product).EntityState ==
        EntityState.Modified);
    context.SaveChanges( );
}
```

Notice that manipulating 308 the current value using this API Pattern will inform the persistence framework of the change (i.e. EntityState will reflect that the state 226 is modified immediately after the change), while setting the value directly on the object property would require comparing a snapshot of the original object obtained from the database against the current value of the property, which is generally an expensive operation that is deferred to happen only at the very end in SaveChanges.

Also notice that overloads of the Property method in DbEntityEntry<T> are generic and through the lambda expression "p=>p.ProductName" used to denote access to the property called ProductName, they can automatically infer the right type for the OriginalValue and CurrentValue properties:

```
public DbPropertyEntry<TEntity, TProperty>
  Property<TProperty>(Expression<Func<TEntity, TProperty>> property);
public DbPropertyEntry<TEntity, TProperty>
  Property<TProperty>(string propertyName);
public DbPropertyEntry Property(string propertyName);
```

Manipulating Nested Properties

Many object persistence frameworks support the concept of non-scalar properties that depend of the containing object for persistence. In Entity Framework these are called Complex properties, and can also be used with entity entries, as illustrated with this example of a nested-property API Pattern 202:

```
using(var context = new CustomerContext( ))
{
    var customer = context.Customers.Find(customerId);
    context.Entry(customer).Property(p =>
        p.Address.Street).CurrentValue = "40th St";
```

```
        context.Entry(customer).ComplexProperty(p =>
    p.Address).Property(a => a.ZipCode).CurrentValue = "98052";
        context.SaveChanges( );
    }
```

Notice it is possible to refer to a nested property directly with a lambda that represents nested access or by drilling in one level at a time with the ComplexProperty method.

Manipulating Relationships

It is possible in some embodiments to access and manipulate 308 entries representing relationships with other persistable objects in similar way. In object graphs 138, relationships are often represented by object references and object collections. In a persistable graph, one aspect of relationships may be that those references or collections (or the actual data contained in those related objects) can be brought into volatile working memory incrementally; loading the whole graph into volatile memory in open operation is often undesirable because the graph itself can be very large.

The following code illustrates this approach, with an example of an incremental-graph-load API Pattern 202:

```
using(var context = new CatalogContext( ))
{
    var product = context.Products.Find(productId);
    var reference = context.Entry(product).Reference(p => p.Category);
    if (!reference.IsLoaded)
        reference.Load( );   Debug.Assert(reference.CurrentValue != null);
}
```

Another familiar goal involving relationships is to load them partially based on a filtering predicate 320. This can be accomplished by obtaining a composable query corresponding to the relationship for a given instance, as for instance in this example using an incremental-graph-filtered-load API Pattern 202:

```
using(var context = new CatalogContext( ))
    {
        var category = context.Categories.Find(categoryId);
        var products =
            from p in context.Entry(category).Collection(c =>
            c.Products).Query( )
            where p.ProductName.StartsWith(s)
            select p;
        return p.ToList( );
    }
```

Working with Property Values in Entity Framework

The Entity Framework keeps track of two values for each property of a tracked entity. The current value 234 is, as the name indicates, the current value of the property in the entity. The original value 232 is the value that the property had when the entity was queried from the database or attached to the session.

There are two general mechanisms in Entity Framework for working with property values:

The value of a single property can be obtained in a strongly typed way using the Property method.

Values for all properties of an entity can be read into a DbPropertyValues object. DbPropertyValues then acts as a dictionary-like object to allow property values to be read and set. The values in a DbPropertyValues object can be set from values in another DbPropertyValues object or from values in some other object, such as another copy of the entity or a simple data transfer object (DTO).

The sections below show examples of using both of the above mechanisms, using additional API Patterns 202.

Getting and Setting the Current or Original Value of an Individual Property

The example below shows how the current value of a property can be read and then set to a new value:

```
using (var context = new UnicornsContext( ))
{
    var unicorn = context.Unicorns.Find(3);
    // Read the current value of the Name property
    string currentName1 = context.Entry(unicorn).Property(u =>
    u.Name).CurrentValue;
    // Set the Name property to a new value
    context.Entry(unicorn).Property(u => u.Name).CurrentValue =
    "Franky";
    // Read the current value of the Name property using a
    // string for the property name
    object currentName2 = context.Entry(unicorn).Property("Name").-
    CurrentValue;
    // Set the Name property to a new value using a
    // string for the property name
    context.Entry(unicorn).Property("Name").CurrentValue = "Squeaky";
}
```

One would use the OriginalValue property instead of the CurrentValue property to read or set the original value. Note that the returned value is typed as "object" when a string is used to specify the property name. On the other hand, the returned value is strongly typed if a lambda expression is used. Setting the property value like this will only mark the property as modified if the new value is different from the old value. When a property value is set in this way the change is automatically detected.

Getting and Setting the Current Value of an Unmapped Property

The current value of a property that is not mapped to the database can also be read. For example:

```
using (var context = new UnicornsContext( ))
{
    var lady = context.LadiesInWaiting.Find(1, "The EF Castle");
    // Read the current value of an unmapped property
    var name1 = context.Entry(lady).Property(p => p.Name).CurrentValue;
    // Use a string to specify the property name
    var name2 = context.Entry(lady).Property("Name").CurrentValue;
}
```

The current value can also be set if the property exposes a setter. Reading the values of unmapped properties is useful when performing Entity Framework validation of unmapped properties. For the same reason, current values can be read and set for properties of entities that are not currently being tracked by the session. For example:

```
using (var context = new UnicornsContext( ))
{
    // Create an entity that is not being tracked
    var unicorn = new Unicorn { Name = "Franky" };
    // Read and set the current value of Name as before
    var currentName1 = context.Entry(unicorn).Property(u =>
    u.Name).CurrentValue;
    context.Entry(unicorn).Property(u => u.Name).CurrentValue =
```

-continued

```
    "Franky";
    var currentName2 = context.Entry(unicorn).Property("Name").-
CurrentValue;
    context.Entry(unicorn).Property("Name").CurrentValue = "Squeaky";
}
```

Note that original values are not available for unmapped properties or for properties of entities that are not being tracked by the session 132.

Checking Whether a Property is Marked as Modified

The example below shows how to check whether or not an individual property is marked 324 as modified:

```
using (var context = new UnicornsContext( ))
{
    var unicorn = context.Unicorns.Find(1);
    var nameIsModified1 = context.Entry(unicorn).Property(u =>
u.Name).IsModified;
    // Use a string for the property name
    var nameIsModified2 = context.Entry(unicorn).Property("Name").
    IsModified;
}
```

The values of modified properties are sent as updates to the database when SaveChanges is called.

Marking a Property as Modified

The example below shows how to force an individual property to be marked 324 as modified:

```
using (var context = new UnicornsContext( ))
{
    var unicorn = context.Unicorns.Find(1);
    context.Entry(unicorn).Property(u => u.Name).IsModified = true;
    // Use a string for the property name
    context.Entry(unicorn).Property("Name").IsModified = true;
}
```

Marking a property as modified forces an update to be sent to the database 134 for the property when SaveChanges is called even if the current value 234 of the property is the same as its original value 232. Some approaches support resetting an individual property to be not modified after it has been marked as modified.

Reading Current, Original, and Database Values for all Properties of an Entity

The example below shows how to read the current values 234, the original values 232, and the values 236 actually in the database for all mapped properties of an entity.

```
using (var context = new UnicornsContext( ))
{
    var unicorn = context.Unicorns.Find(1);
    // Make a modification to Name in the tracked entity
    unicorn.Name = "Franky";
    // Make a modification to Name in the database
    context.Database.SqlCommand("update Unicorns set Name = 'Squeaky'
    where Id = 1");
    // Print out current, original, and database values
    Console.WriteLine("Current values:");
    PrintValues(context.Entry(unicorn).CurrentValues);
    Console.WriteLine("\nOriginal values:");
    PrintValues(context.Entry(unicorn).OriginalValues);
```

```
    Console.WriteLine("\nDatabase values:");
    PrintValues(context.Entry(unicorn).GetDatabaseValues( ));
}
```

PrintValues is defined like so:

```
public static void PrintValues(DbPropertyValues values)
{
    foreach (var propertyName in values.PropertyNames)
    {
        Console.WriteLine("Property {0} has value {1}",
            propertyName, values[propertyName]);
    }
}
```

With a sample data set, running the code above will print out:
Current values:
Property Id has value 1
Property Name has value Franky
Property Version has value System.Byte[ ]
Property PrincessId has value 1
Original values:
Property Id has value 1
Property Name has value Binky
Property Version has value System.Byte[ ]
Property PrincessId has value 1
Database values:
Property Id has value 1
Property Name has value Squeaky
Property Version has value System.Byte[ ]
Property PrincessId has value 1

Notice how the current values are, as expected, the values that the properties of the entity currently contain—in this case the value of Name is Franky. In contrast to the current values, the original values are the values that were read from the database when the entity was queried—the original value of Name is Binky. Finally, the database values are the values as they are currently stored in the database. The database value of Name is Squeaky because we sent a raw command to the database to update it after we performed the query. Getting the database values is useful when the values in the database may have changed since the entity was queried such as when a concurrent edit to the database has been made by another user.

Setting Current or Original Values from Another Object

The current or original values of a tracked entity (tracked object 122) can be updated by copying values from another object 122. For example:

```
using (var context = new UnicornsContext( ))
{
    var princess = context.Princesses.Find(1);
    var rapunzel = new Princess { Id = 1, Name = "Rapunzel" };
    var rosannella = new PrincessDto { Id = 1, Name = "Rosannella" };
    // Change the current and original values by copying the values
    // from other objects
    var entry = context.Entry(princess);
    entry.CurrentValues.SetValues(rapunzel);
    entry.OriginalValues.SetValues(rosannella);
    // Print out current and original values
    Console.WriteLine("Current values:");
    PrintValues(entry.CurrentValues);
```

-continued

```
Console.WriteLine("\nOriginal values:");
PrintValues(entry.OriginalValues);
}
```

This code uses the following DTO class:

```
public class PrincessDto
{
    public int Id { get; set; }
    public string Name { get; set; }
}
```

Using a sample data set, running the code above will print out:
Current values:
Property Id has value 1
Property Name has value Rapunzel
Original values:
Property Id has value 1
Property Name has Value Rosannella This API Pattern may be used, for example, when updating an entity with values obtained from a service call or a client in an n-tier application. Note that the object used does not have to be of the same type as the entity so long as it has properties whose names match those of the entity. In the example above, an instance of PrincessDTO is used to update the original values. Note that only properties that are set to different values when copied from the other object will be marked as modified in this implementation.

Setting current or original values from a dictionary The current or original values of a tracked entity can be updated by copying values from a dictionary 330 or some other data structure. For example:

```
using (var context = new UnicornsContext( ))
{
    var lady = context.LadiesInWaiting.Find(1, "The EF Castle");
    var newValues = new Dictionary<string, object>
    {
        { "FirstName", "Calypso" },
        { "Title", " Prima donna" },
    };
    var currentValues = context.Entry(lady).CurrentValues;
    foreach (var propertyName in newValues.Keys)
    {
        currentValues[propertyName] = newValues[propertyName];
    }
    PrintValues(currentValues);
}
```

One would use the OriginalValues property instead of the CurrentValues property to set original values.

Setting current or original values from a dictionary using Property

An alternative to using CurrentValues or OriginalValues as shown above is to use the Property method to set the value of each property. This can be used to set the values of complex properties. For example:

```
using (var context = new UnicornsContext( ))
{
    var castle = context.Castles.Find("The EF Castle");
```

-continued

```
    var newValues = new Dictionary<string, object>
    {
        { "Name", "The EF Castle" },
        { "Location.City", "Redmond" },
        { "Location.Kingdom", "Building 18" },
        { "Location.ImaginaryWorld.Name", "Magic Astoria World" },
        { "Location.ImaginaryWorld.Creator", "ADO.NET" },
    };
    var entry = context.Entry(castle);
    foreach (var propertyName in newValues.Keys)
    {
        entry.Property(propertyName).CurrentValue =
        newValues[propertyName];
    }
}
```

In the example above complex properties are accessed using dotted names.

Creating a Cloned Object Containing Current, Original, or Database Values

The DbPropertyValues object returned from CurrentValues, OriginalValues, or GetDatabaseValues can be used to create 326 a clone of the entity. This clone will contain the property values from the DbPropertyValues object used to create it. For example:

```
using (var context = new UnicornsContext( ))
{
    var unicorn = context.Unicorns.Find(1);
    var clonedUnicorn = context.Entry(unicorn).
    GetDatabaseValues( ).ToObject( );
}
```

Note that the object returned is not the entity and is not being tracked by the session, in this implementation. The returned object also does not have any relationships set to other objects. The cloned object can be useful for resolving issues related to concurrent updates to the database, especially where a UI that involves data binding to objects of a certain type is being used.

Getting and Setting the Current or Original Values of Complex Properties

The value of an entire complex object can be read and set using the Property method just as it can be for a primitive property. In addition, in this implementation you can drill down into the complex object and read or set properties of that object, or even a nested object.

Here are some examples:

```
using (var context = new UnicornsContext( ))
{
    var castle = context.Castles.Find("The EF Castle");
    // Get the Location complex object
    var location = context.Entry(castle)
            .Property(c => c.Location)
            .CurrentValue;
    // Get the nested ImaginaryWorld complex object using chained calls
    var world1 = context.Entry(castle)
            .ComplexProperty(c => c.Location)
            .Property(I => I.ImaginaryWorld)
            .CurrentValue;
    // Get the nested ImaginaryWorld complex object using a single lambda expression
    var world2 = context.Entry(castle)
            .Property(c => c.Location.ImaginaryWorld)
            .CurrentValue;
    // Get the nested ImaginaryWorld complex object using a dotted string
```

-continued

```
var world3 = context.Entry(castle)
      .Property("Location.ImaginaryWorld")
      .CurrentValue;
// Get the value of the Creator property on the nested complex object
// using chained calls
var creator1 = context.Entry(castle)
      .ComplexProperty(c => c.Location)
      .ComplexProperty(I => I.ImaginaryWorld)
      .Property(w => w.Creator)
      .CurrentValue;
// Get the value of the Creator property on the nested complex object
// using a single lambda expression
var creator2 = context.Entry(castle)
      .Property(c => c.Location.ImaginaryWorld.Creator)
      .CurrentValue;
// Get the value of the Creator property on the nested complex object
// using a dotted string
var creator3 = context.Entry(castle)
      .Property("Location.ImaginaryWorld.Creator")
      .CurrentValue;
}
```

One would use the OriginalValue property instead of the CurrentValue property to get or set an original value. Note that either the Property or the ComplexProperty method can be used to access a complex property. However, the ComplexProperty method would be used to drill down into the complex object with additional Property or ComplexProperty calls.

Using DbPropertyValues to Access Complex Properties

When you use CurrentValues, OriginalValues, or GetDatabaseValues to get all the current, original, or database values for an entity, the values of any complex properties are returned as nested DbPropertyValues objects. These nested objects can then be used to get values of the complex object. For example, the following method will print out the values of all properties, including values of any complex properties and nested complex properties.

```
public static void WritePropertyValues(string parentPropertyName,
DbPropertyValues propertyValues)
{
   foreach (var propertyName in propertyValues.PropertyNames)
   {
      var nestedValues = propertyValues[propertyName] as
      DbPropertyValues;
      if (nestedValues != null)
      {
         WritePropertyValues(parentPropertyName + propertyName + ".",
nestedValues);
      }
      else
      {
         Console.WriteLine("Property {0}{1} has value {2}",
               parentPropertyName, propertyName,
               propertyValues[propertyName]);
      }
   }
}
```

To print out all current property values the method would be called like this:

```
using (var context = new UnicornsContext( ))
{
   var castle = context.Castles.Find("The EF Castle");
   WritePropertyValues("", context.Entry(castle).CurrentValues);
}
```

Using a sample data set, running the code above will print out:
Property Name has value The EF Castle
Property Location.City has value Redmond
Property Location.Kingdom has value Rainier
Property Location lmaginaryWorld.Name has value Magic Unicorn World
Property Location lmaginaryWorld.Creator has value ADO-.NET

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer system comprising:
   a logical processor;
   a memory in operable communication with the logical processor;
   an object-relational mapping session residing in the memory;
   a mapped persistence ignorant object residing in the memory and having at least one state as part of the session;
   a fluent interface residing in the memory; and
   a developer code containing an API Pattern and residing in the memory, which upon execution of the developer code manipulates the mapped persistence ignorant object using calls to the fluent interface in the API Pattern.

2. The system of claim 1, wherein the API Pattern is a find-delete-save API Pattern, namely, an API Pattern which specifies a verification that the object's state is unchanged, a post-verification change to the object's state to indicate deletion, and a post-change action to save the session.

3. The system of claim 1, wherein the API Pattern is a current-value-original-value API Pattern, namely, an API Pattern which specifies an action on a current value of the object and also specifies an action on a corresponding original value of the object.

4. The system of claim 1, wherein the object is a containing object in that the object contains a non-scalar property which depends on the object for persistence, and wherein the API Pattern is a nested-property API Pattern, namely, an API Pattern which specifies an action on the non-scalar property.

5. The system of claim 1, wherein multiple persistable objects reside in the memory and are related to one another by references, thereby forming a graph, and wherein the API Pattern is an incremental-graph-load API Pattern, namely, an API Pattern which specifies incrementally loading portions of the graph into volatile memory.

6. The system of claim 1, wherein multiple persistable objects reside in the memory and are related to one another by references, thereby forming a graph, and wherein the API Pattern is an incremental-graph-filtered-load API Pattern, namely, an API Pattern which specifies incrementally loading portions of the graph into volatile memory based on a filtering predicate.

7. The system of claim 1, wherein the API Pattern is a property-modification API Pattern, namely, an API Pattern which specifies at least one of the following actions on a property of the object: checking whether the property is marked as modified, marking the property as modified.

8. The system of claim 1, wherein the API Pattern is a dictionary API Pattern, namely, an API Pattern which specifies at least one of the following actions on the object: setting a current value of the object from a dictionary, setting an original value of the object from a dictionary.

9. A computer-readable storage medium configured with data and with instructions that when executed by at least one processor causes the processor(s) to perform a process for managing object persistence, the process comprising the steps of:
   obtaining an ORM session from an object-relational mapper;
   receiving in a memory a code which contains calls to a fluent interface in an API Pattern;
   executing the code with at least one processor; and
   in the course of executing the code, automatically manipulating a persistence ignorant object within the ORM session in a manner consistent with the API Pattern.

10. The configured medium of claim 9, wherein the receiving step receives in memory a code which contains calls to a fluent interface, and the calls are written in a strongly typed language.

11. The configured medium of claim 9, wherein executing the code manipulates at least one of the following: a state of the persistence ignorant object, a property state of the persistence ignorant object, a persistent relationship of the persistence ignorant object.

12. The configured medium of claim 9, wherein executing the code includes manipulating a persistence ignorant object in at least six of the following ways:
   finding that a state of the object is unchanged, then changing the object's state to indicate deletion, and then saving the session;
   accessing both a current value and an original value of the object;
   accessing a non-scalar property that depends on the containing object for persistence;
   incrementally loading into volatile memory portions of a graph containing the object;
   incrementally loading into volatile memory, based on a filtering predicate, portions of a graph containing the object;
   checking whether a property of the object is marked as modified;
   marking a property of the object as modified;
   reading current, original, and database values for all properties of an object;
   setting current and/or original values of the object from another object;
   setting current and/or original values of the object from a dictionary;
   creating a cloned object containing current, original, and/or database values of the object.

13. The configured medium of claim 9, wherein executing the code includes manipulating a persistence ignorant object in at least three of the following ways:
   accessing a non-scalar property that depends on the containing object for persistence;
   incrementally loading into volatile memory portions of a graph containing the object;
   checking whether a property of the object is marked as modified;
   marking a property of the object as modified;
   setting current and/or original values of the object from another object;
   setting current and/or original values of the object from a dictionary;
   creating a cloned object containing current, original, and/or database values of the object.

14. The configured medium of claim 9, wherein executing the code includes manipulating a persistence ignorant object in at least one of the following ways:
   incrementally loading into volatile memory portions of a graph containing the object;
   setting current and/or original values of the object from another object;
   setting current and/or original values of the object from a dictionary;
   creating a cloned object containing current, original, and/or database values of the object.

15. The configured medium of claim 9, wherein executing the code includes manipulating a persistence ignorant object in at least one of the following ways:
- accessing a non-scalar property that depends on the containing object for persistence;
- checking whether a property of the object is marked as modified;
- marking a property of the object as modified.

16. A developer process for managing object persistence, comprising the steps of:
- writing in a piece of software a portion of code for obtaining an ORM session from an object-relational mapper;
- writing in the software another portion of code which contains an API Pattern that includes calls to a fluent interface for manipulating a mapped persistence ignorant object;
- causing execution of the codes by a computer system utilizing a memory in operable communication with a least one processor; and
- ascertaining a result of the execution by inspecting the object.

17. The process of claim 16, wherein writing code which contains an API Pattern comprises writing code which contains fluent interface calls in at least three of the following:
- a find-delete-save API Pattern;
- a current-value-original-value API Pattern;
- a nested-property API Pattern;
- an incremental-graph-load API Pattern;
- an incremental-graph-filtered-load API Pattern;
- a property-modification API Pattern;
- a dictionary API Pattern.

18. The process of claim 16, wherein writing code which contains an API Pattern comprises writing code which contains fluent interface calls in at least one of the following:
- a find-delete-save API Pattern;
- a current-value-original-value API Pattern;
- a nested-property API Pattern;
- an incremental-graph-load API Pattern;
- an incremental-graph-filtered-load API Pattern;
- a property-modification API Pattern;
- a dictionary API Pattern.

19. The process of claim 16, wherein inspecting the object comprises inspecting a current value of the object and a corresponding original value of the object.

20. The process of claim 16, wherein writing code comprises method chaining calls of the fluent interface.

* * * * *